UNITED STATES PATENT OFFICE.

FRANCIS EDWARD MATTHEWS, OF BLACKHEATH, AND EDWARD HALFORD STRANGE, OF LONDON, ENGLAND.

PROCESS FOR THE PURIFICATION OF UNSATURATED HYDROCARBONS CONTAINING THE CONJUGATED BOND.

1,196,259.     Specification of Letters Patent.     Patented Aug. 29, 1916.

No Drawing.     Application filed March 16, 1915. Serial No. 14,779.

*To all whom it may concern:*

Be it known that we, FRANCIS EDWARD MATTHEWS, Ph. D., F. I. C., a subject of the King of the United Kingdom of Great Britain and Ireland, and residing at Ash Lawn, The Glebe, Blackheath, in the county of Kent, England, and EDWARD HALFORD STRANGE, M. Sc., a subject of the King of the United Kingdom of Great Britain and Ireland, and residing at Staple Inn, in the county of London, England, have invented a new and useful Improved Process for the Purification of Unsaturated Hydrocarbons Containing the Conjugated Bond, of which the following is a specification.

When sulfur dioxid reacts with an unsaturated hydrocarbon containing the conjugated double bond as described in the specification of the German Patent No. 236,386 there is formed a mixture consisting of two sulfoxids of the hydrocarbon. One of these compounds is crystalline and soluble, the other amorphous and insoluble. On heating, the crystalline compound is decomposed quantitatively into sulfur dioxid and the initial hydrocarbon which may in this manner be obtained in a state of great purity. The amorphous form may also be partially decomposed in this manner but the yield of hydrocarbon is very much less.

The amorphous form is insoluble in all ordinary solvents and is consequently not capable of purification. The crystalline form is soluble in water and other solvents and begins to break up into the initial hydrocarbon and sulfur dioxid at a comparatively low temperature (about 120° C.), whereas the insoluble or amorphous form requires a much higher temperature for decomposition to be effected, and moreover the yield of hydrocarbon as stated above is not nearly so good. It is therefore clearly desirable to obtain the product in the crystalline form as far as possible. When however sulfur dioxid reacts on a hydrocarbon having the conjugated double bond the amorphous sulfoxid is chiefly formed, the quantity of the soluble crystalline compound being comparatively small.

According to our invention, in order that the product may consist almost entirely of the crystalline soluble sulfoxid, we add certain substances to the mixture of the hydrocarbon and the sulfur dioxid. Such substances are gaseous or liquid hydrochloric acid or other halogen acids, iodin, acid chlorids, *e. g.* acetyl chlorid, sulfuryl chlorid, sulfur chlorid, thionyl chlorid, and sulfonic chlorids. These substances are hereinafter collectively designated as halogen-containing bodies serving to promote the formation of a crystallizable sulfoxid.

The following is an example of one manner of carrying out the invention: 174 grams of impure isoprene obtained by cracking turpentine, were taken and 16 grams of an alcoholic solution of hydrochloric acid of strength 40% together with 198 grams of liquid sulfur dioxid were added and the mixture was sealed up in a glass tube. After heating in a water bath at a temperature of 42° C. for a short time the tube was opened and a considerable amount of uncombined hydrocarbon together with the excess of sulfur dioxid was distilled off. The remainder of the contents of the tube solidified on cooling and was dissolved in hot water and filtered. From this eight grams of insoluble matter consisting of insoluble sulfoxid and tarry impurities together with 149 grams of pure crystalline sulfoxid was obtained. The pure crystallized sulfoxid can then be decomposed by heat so as to give an almost quantitative yield of the initial hydrocarbon in a pure state.

What we claim as our invention and desire to secure by Letters Patent is:—

1. In a process of purifying unsaturated hydrocarbons having a conjugated double bond, the step which consists in reacting thereon with sulfur dioxid in presence of a halogen-containing body serving to promote the formation of a crystallizable sulfoxid.

2. In a process of purifying isoprene, the step which consists in reacting thereon with sulfur dioxid in presence of a halogen-containing body serving to promote the formation of a crystallizable sulfoxid.

In testimony whereof we have signed our names to this specification in the presence of two subscribing witnesses.

FRANCIS EDWARD MATTHEWS.

Witnesses:
FRED. J. WILLIAMS,
J. ROWLAND WHINCOP.

EDWARD HALFORD STRANGE.

Witnesses:
J. ROWLAND WHINCOP,
CHOLMAN HOLMES.